J. L. Ressler.
Churn.

№ 94,646.　　　　　Patented Sep. 7, 1869.

Witnesses
Harry King
Leopold Evens

Inventor
John L. Ressler
per
Alexander Thurston
Attys

United States Patent Office.

JOHN L. RESSLER, OF RAMSBURG, PENNSYLVANIA.

Letters Patent No. 94,645, dated September 7, 1869.

IMPROVEMENT IN CHURNS.

The Schedule referred to in these Letters Patent and making part of the same.

*To all whom it may concern:*

Be it known that I, JOHN L. RESSLER, of Ramsburg, in the county of Bedford, and in the State of Pennsylvania, have invented certain new and useful Improvements in Churns; and do hereby declare that the following is a full, clear, and exact description thereof, reference being had to the accompanying drawings, and to the letters of reference marked thereon, making a part of this specification.

The nature of my invention consists in the construction and general arrangement of a box-churn, as will be hereinafter fully set forth.

In order to enable others skilled in the art to which my invention appertains, to make and use the same, I will now proceed to describe its construction and operation, referring to the annexed drawings, in which—

Figure 2:
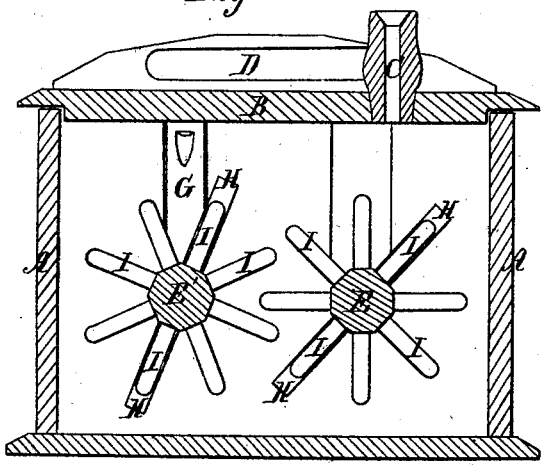
Figure 2 is a vertical cross-section.

A represents a box, of suitable dimensions, having a cover, B, which is let into the box, as seen in fig. 2, so as to close the box perfectly. The cover B is provided with a tube, C, to allow the air to escape, and also, on its upper side, with cleats, D D, by which it can be easily removed from the box.

At a suitable height, above the bottom of the box A, are placed two octagon rollers, E E', the journals of which have their bearings in the ends of the box. One of the journals of the roller E is provided with, or connected to a crank F, which passes through the side of the box, and is surrounded by a rubber washer, a, that presses against the outer side of the box, thus preventing any leakage through the eye of the crank. The washer a is held in its place by a nut, b, for which purpose the crank is provided with screw-threads at the point where it passes through the end of the box.

Figure 1:
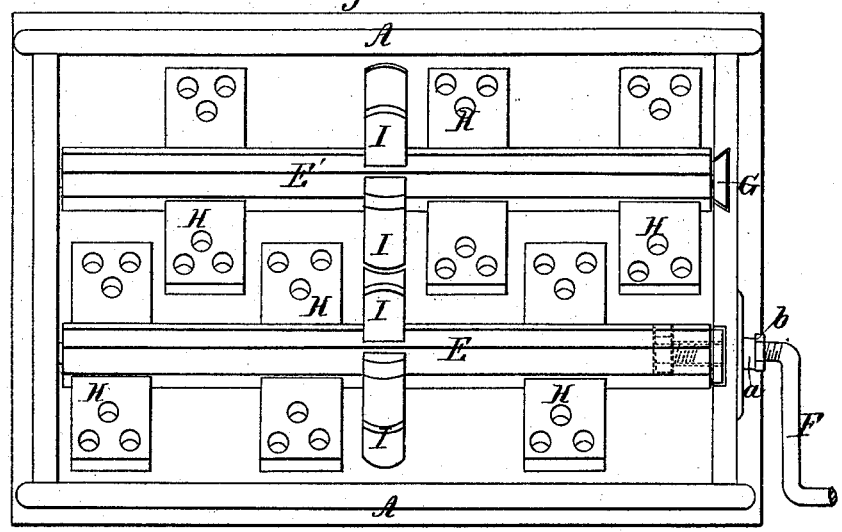
Figure 1 is a plan view, the cover being removed.

Within the roller E is placed a nut or tap, into which the end of the crank F is screwed, as seen in dotted lines in fig. 1. One end of the box A is provided with vertical grooves, in which the journals of the rollers or reels E E' are placed, the other journals being placed in holes or circular recesses in the other end of the box, so that the said reels may be readily removed and put in at pleasure.

The reel E is held down in a horizontal position, by the crank F being screwed into the same, as above mentioned, while the reel E' is held down by a slide, G, placed in the groove, in which one of the journals of this reel is placed, said groove and slide being dovetailed for that purpose, as seen in fig. 1.

The reels E E' are provided with a number of perforated fans, H H, and also with fingers, I I, in the centre, which latter gear into each other, so that when the crank is turned the fans will revolve toward each other.

All the parts of this churn are made of wood, except the crank and its fastenings, these, however, not being exposed to the cream, thus making a very cheap and durable churn.

The reel E' is to be removed to allow the other room to gather the butter, when it is broken.

I am aware that the several devices herein shown and described, when taken separately, are, of themselves, not new.

Having thus fully described my invention,

What I claim as new, and desire to secure by Letters Patent, is—

The combination of the box A, cover B, tube C, cleats D D, reels E E', crank F, slide G, perforated fans H H, and fingers I I, all constructed, arranged, and combined to operate substantially in the manner and for the purposes herein set forth.

In testimony that I claim the foregoing, I have hereunto set my hand, this 29th day of May, 1869.

JOHN L. RESSLER.

Witnesses:
  H. W. RESSLER,
  JOHN H. MOWER.